Patented Aug. 1, 1944

2,355,030

UNITED STATES PATENT OFFICE 2,355,030

FOOD COMPOSITION

Sidney Musher, New York, N. Y., assignor to Musher Foundation Incorporated, New York, N. Y., a corporation of New York No Drawing. Application May 4, 1944,
Serial No. 534,163

13 Claims. (Cl. 99—1)

The present invention relates to stabilized food compositions and particularly relates to stabilized food compositions having a relatively high viscosity when in liquid or melted condition as well as possessing good body and texture.

In producing food products of desirable body and texture it has been customary to utilize various ingredients or combinations thereof such as gelatin, sodium alginate, algin, pectin, agar, Irish moss, psyllium seed, gum tragacanth and India gum.

These materials are not only quite expensive but furthermore it is difficult to obtain in many food products a desirable combination of physical characteristics such as proper viscosity, body and texture.

An object of the present invention is therefore to provide a stabilizer and ingredient for food products which will supply at low cost good body, texture and viscosity as well as other desirable physical characteristics by economical and readily available means.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

It has now been found that when a certain fraction of oats has been properly separated from the oat grain and desirably finely divided it may be incorporated as an ingredient and stabilizer in a food product to give such food product excellent body, texture and viscosity so that the food product containing the special oat fraction of the present invention will stand up for a long period of time in the dealers' cabinets and in the manufacturing plant.

These stabilizing properties are not to be found in the oat grain as a whole or in ordinary oat products as, for example, in oat flour made by grinding oat groats or in pulverized oats or oat hulls. These properties are only developed when a special fraction of the oat grain is removed from the balance of the oat grain.

This special oat fraction is a relatively low starch, relatively high protein fraction which may be obtained after removal of the cellulosic hulls of the oats and after removal of a large portion of the relatively high starch fraction.

This particular fraction of oats is best prepared by first milling the oats to remove the cellulosic hulls leaving the oat groats. This is desirably accomplished by drying the oats with their hulls to reduce the moisture content in order more readily to remove the hulls from the oats. The oat groats thus obtained are then specially processed to remove the relatively high starch fraction and to concentrate the relatively high protein fraction thereof, obtaining a fraction which contains desirably in excess of about 20% protein and most desirably in excess of 22% protein.

In treating these oat groats to obtain the special stabilizer desired the groats are pulverized desirably in an attrition mill to such an extent that at least 50% and desirably 80% to 90% will pass through a screen or mesh or bolting cloth having a fineness in excess of about 60 mesh and desirably having a fineness in excess of 70 mesh.

The oat groats are ground as indicated above and the ground groats are then separated as by aspirating or screening into two fractions, namely, a coarse fraction and a fine fraction, the coarse fraction comprising the minor fraction of less than 50% by weight and most desirably comprising 10% to 20% of the total weight of the ground oat groats and the fine fraction comprising over 50% and most desirably between 80% and 90% of the total weight of the ground oat groats.

It is the coarse residue which is left after such grinding and screening or bolting or after aspirating which is found to contain the properties most desirable for incorporation in food products such as in ice cream or other frozen desserts as the stabilizer, and the gum and stabilizing effect is most particularly observed after the coarse fraction has all been ground to a fineness of at least 50 mesh and most desirably to at least 60 mesh.

This effect is not evident or evidenced when the whole oats are ground and utilized as such or when the oat flour made by grinding oat groats is utilized as such because of the fact that other constituents therein render ineffective the unusual stabilizing or gummy properties of the ground, relatively high protein and relatively low starch containing dehulled oat fraction of the present invention. The unusual stabilizing or gummy properties described herein are obtainable only by the use of the novel oat product of the present invention, which novel oat product is obtained in accordance with the procedure outlined herein.

In the preferred procedure, the oat groats, after removal of the hulls by milling processes, are pulverized or ground and then by aspirating, bolting or screening, the relatively high starch containing oat fraction is removed. The pulverized oat groats may, for example, be aspirated to separate the minor fraction of the relatively low starch and relatively high protein containing materials. This process may where desirable be continued by regrinding, rescreening or reaspiration until the relatively high starch material has been largely removed leaving the relatively high protein fraction behind desirably to be ground to at least 60 mesh for use in accordance with the procedures of the present invention.

The coarse fraction obtained will generally have a protein content in excess of 20% and more desirably in excess of 22%. At the same time the starch content of the coarse fraction will be reduced to much less than the starch content of the fine fraction. For example, the starch content of the coarse fraction will be about 5% to 10% or more less than the starch content of the fine fraction.

According to one method of separating the relatively high starch fraction which is necessary to obtain the gelatinous properties in most highly developed condition, the groats are ground so that a major proportion thereof, say at least 50% to 80%, will have a fineness in excess of about 60 mesh and desirably at least 60% to 70% of the ground material will have a sufficient fineness to go through about a 90 mesh screen.

Then the ground material is screened, preferably through a fine silk screen or aspirated to remove all particles which will not go through a 60 mesh screen.

A most highly desirable method is to grind the oat groats until over 75%, and desirably between 80% and 90% will go through a 70 mesh screen but wherein the balance of between 10% and 20% remains on the screen. Then the ground groats are aspirated or screened to remove all the coarse particles and to separate the fine fraction comprising 80% to 90% from the coarse fraction comprising the balance of 10% to 20% which coarse fraction is used in accordance with the procedures of the present invention.

The oat material which goes through the screen or the fine material which is aspirated will contain the relatively high starch fraction whereas the material left behind on the screen or the coarse fraction thereof will be relatively low in starch content.

This coarse, relatively low starch and relatively high protein material is desirably finely divided and may then be used in accordance with the procedures of the present invention, the unusual stabilizing properties now being present with the removal of the cellulosic hulls and the relatively high starch fraction of the oat groats.

These coarser particles in which the stabilizing properties are concentrated are most desirably ground such as in a hammer or stone or attrition mill to a particle size of at least 50 mesh and more desirably so that all of the coarse particles will go through at least a 60 mesh screen. This may be accomplished by first grinding the coarse particles and separating that fraction which will go through a 60 or more mesh screen followed by regrinding the remaining coarse portion and continuing the grinding and separating until all of the coarse fraction has been ground to a point where the entire coarse fraction will go through at least a 60 mesh screen.

This material although very different in composition, qualities and chemical structure from gelatin, sodium alginate, algin, pectin, Irish moss and psyllium seed, when added to a food product such as to a cream cheese results in giving the food product most desirable qualities.

Moreover, the stabilizing action given by this particular fraction of oats is given by neither the oat flour produced by grinding oat groats nor by starch.

Moreover, the product produced in accordance with the present invention has not been found replaceable by any other fraction of oats, or by any other type of cereal or its fractions, including wheat or its fractions, corn or its fractions, barley or its fractions, rye or its fractions, rice or its fractions, or other types of cereals which the applicant has carefully studied.

Although the chemical composition may vary it has been found that 20% protein should be present and most desirably 22% protein. Highly desirable materials have been made containing 25% to 29% protein.

It has been found possible, where desired, to bleach this special oat fraction with chlorine or hypochlorite to lighten its color. It is also possible to obtain this bleaching effect with reducing agents such as sulfites but these reducing agents are not as effective as the oxidizing bleaching agents.

By the term "dry milled oat product" as used in the present application and claims is meant an oat product which has been subjected to either grinding, screening, bolting, aspirating or combinations thereof or even to oil solvent extraction but wherein the oat product has been processed in the substantial absence of water.

This special oat fraction made by the present invention and which desirably has been finely divided to at least about 60 mesh may be used as a stabilizer and ingredient for food products and particularly for cream cheese, salad dressings, ices, icings, and similar compositions, the addition being made in an amount of under 15% and preferably less than 10%. For most purposes, not over about 2% of the special oat fraction is used.

In the case of ice cream, the special oat fraction serves a special and unusual purpose and is added to the ice cream mix desirably before pasteurizing and homogenizing. The addition is preferably made while the mix is still cool and at a temperature of not exceeding 100° F. Where desired, the finely divided special oat fraction may be mixed with about 4 parts of its weight of a dry sugar followed by adding the combination to the mix. The pasteurization temperature may be between about 145° F. and 165° F. to 170° F. and preferably the higher temperature ranges of 160° F. to 170° F.

In the case of sherbets, ices and other similar frozen dessert compositions the finely divided special oat fraction of the present invention may be added directly to the mix or a combination may first be prepared of 1 part of the special oat fraction with 1 to 4 parts of sugar and 2 to 5 parts of water or milk or skim milk followed by heating to about 145° F. to 170° F. and then added to the sherbet, fruit ice or ice mix in the normal manner and in the desired proportion.

The finely divided special oat fraction of the present invention may be used with frozen dessert compositions and particularly with ice cream in the production of any flavor or frozen dessert such as in the production of strawberry ice cream, chocolate ice cream, peach ice cream, vanilla ice cream, etc.

Furthermore, the special oat fraction of the present invention which desirably has been finely divided may be added to cream before freezing where the cream is subsequently to be used in the manufacture of ice cream or other similar frozen dessert or may be added to the fruit such as to strawberries, peaches, etc., in a minor amount of less than 2% and desirably between 0.1% and 0.75% at the time the fruits are frozen.

The special oat fraction of the present invention which desirably has been finely divided may be used for addition to a food composition or to food compositions containing a minor amount of water or similar aqueous medium with or without short or prolonged heating to obtain unusual thickening, gelatinous and gummy characteristics.

As little as 0.05% to 2% of the finely divided special oat fraction of the present invention may be utilized to develop unusual physical stabilizing characteristics and where desired even higher amounts may be employed such as up to about 5% to 10% although it is preferable to use not over about 2% against the weight of the food product.

For example, in the manufacture of icings, the special oat fraction produced in accordance with the present invention and which desirably has been finely divided may be added to the icing composition in an amount of less than about 2% in lieu of pectin, algin, gelatin or similar stabilizer.

In the manufacture of cream cheese and other cheese spreads, the finely divided special oat fraction may be used in an amount of between 0.4% and 1.5% in replacement for locust bean gum to retard syneresis, to give stabilization and fine body and texture and smoothness to the cream cheese.

For example, among the "cheese spreads" for which the special oat fraction of the present invention may be used there are included pasteurized cheeses or pasteurized blended cheeses which may be made by comminuting and mixing, with the aid of heat and water, one or more lots of cheese into a homogeneous plastic mass. There may also be used processed cheeses which will generally contain not more than about 40% of water and not less than about 50% of milk fat. Other cheeses for which the special oat fraction of the present invention may be used included cream cheese, creamed cottage cheese, cottage cheese and similar cheese spreads and among the cream cheese spreads there are included cheese relishes such as pimento cheese spreads, olive cheese spreads, pineapple cheese spreads and Roquefort cream cheese spreads.

For these cheese spreads and particularly for cream cheese, creamed cottage cheese and processed cheeses between 0.4% and 1.5% and desirably between about 0.5% and 0.75% of the finely divided special oat fraction is added to the cheese product in order to retard syneresis and to retard the moisture from leaking out from the cheese and to retain in the cheese firm body and texture and desirably physical characteristics.

In the case of cream cheese, for example, and where a "cold pack" cream cheese is made, that is, where the cream cheese is not subjected to any cooking procedure, the special oat fraction is added to the cream before pasteurizing as, for example, at a temperature of 145° F. for 30 minutes. The cream cheese is then homogenized, cooled to 60° F. to 70° F., with the addition of a starter, followed by draining to remove excess moisture and packaging.

In the case of "hot pack" cream cheese the cream may be heated to 160° F. to 170° F. followed by the addition of salt and the special oat fraction and then followed by homogenizing. After homogenizing the cheese is heated to 175° F. and packaged, this procedure being followed by the addition of the proper amount of starter and rennet in order to develop the satisfactory flavor.

The most preferable procedure in the case of cream cheese or other cheese spreads is to add the small amount of the special oat fraction to the dairy product before homogenizing and desirably before heating or cooking. The homogenizing should take place at least at 1500 pounds pressure and desirably at a minimum of 2000 pounds pressure. Apparently by the addition of the small amount of the special oat fraction to the dairy product before homogenizing the value of the special oat fraction is enhanced, the homogenizing procedure appearing to give a more thorough dispersion of the particles of the special oat fraction through the body of the cheese product and whereby there is obtained the maximum benefits from the stabilizing, thickening and syneresis retarding properties of the special oat fraction.

Where desired, there may also be used in combination with the special oat fraction a minor amount, such as between 10% and 25%, of gum karaya or other gum, but the special oat fraction itself is highly valuable for preventing leakage and syneresis from occurring in the finished cheese product and in giving the cheese highly desirable and unusual physical stabilizing characteristics.

In adding the special oat fraction to the processed cheese or cream cheese or other cheese spread where salt is used the special oat fraction is desirably first mixed thoroughly with the salt and then added to the cream or other milk product used in the production of the cheese spread.

In the manufacture of candies and confections the special oat fraction which desirably has been finely divided may be used in chocolate coatings to give improved spreading and dipping qualities to the chocolate and to retard blooming. The finely divided special oat fraction may also be used in fondants, gum drops, cream and marshmallow fillings, as well as for other candy and confectionery products to give unusual thickening and stabilization characteristics.

In marshmallow fillings the finely divided special oat fraction may be employed in replacement for corn syrup to give a high quality marshmallow product on the basis of using, for example, from 0.3% to 1.5% of the finely divided special oat fraction in lieu of 10% or more of the corn syrup normally employed.

Similarly in the manufacture of jams and jellies, fruit icings and similar compositions, the finely divided special oat fraction of the present invention may be employed in place of the more expensive gums to give high stabilization characteristics.

The finely divided special oat fraction may also be utilized for bakery purposes such as for pie fillings, custards and puddings and where desired the results of the present invention may be obtained without substantial gelatinization or without heating to a temperature of 160° F. or more.

An unusual stabilizing effect is also obtained by the addition of the special oat fraction to salad dressings such as to mayonnaise which normally contains in excess of 65% total oil content, to the usual type of salad dressing which will generally be composed of 40% or less of oil with or without eggs and with starches, to French dressings, tartar spreads, relish spreads, fruit salad dressings, etc.

The special oat fraction is added to these products preferably in an amount of less than about 5% and desirably in an amount of between 0.5% and 2% by weight against the weight of the salad dressing. The preferred method is to add the special oat fraction to the oil normally used in the production of the salad dressing, dispersing the special oat fraction in the oil and then adding the oil containing the special oat fraction to the salad dressing in the normal manner. This disperses the special oat fraction throughout the body of the salad dressing, obtaining maximum stabilizing benefits. Where desired, the special oat fraction may also be admixed with the starch and the starch containing the special oat fraction may then be gelatinized in the normal manner.

The preferred amount of the special oat fraction to be used in the food composition is desirably not over 2% and preferably 1% or less, and the special oat fraction should be finely divided so that it will have a fineness in excess of about 50 mesh and preferably in excess of 60 mesh.

In all cases the most preferred procedure in the method of adding the special oat fraction to the food composition such as the cheese spread or to the salad dressing is for the special oat fraction to be thoroughly distributed throughout the body of the food composition with mechanical agitation. This agitation involves mixing by means of paddles in order to make certain that all of the special oat fraction is not only mixed throughout the body of the food composition but that the full physical stabilizing benefits of the special oat fraction are obtained.

In an ice cream or similar frozen dessert generally the preferred amount to be used is between 0.5% and 0.75% against the total weight of the mix, that is, against the total weight of all the ice cream ingredients such as the milk, sugar, flavoring and other materials used. For example, between 5 pounds and 7½ pounds of the finely divided special oat fraction are added to each 1000 pounds of ice cream mix. In the case of sherberts and ices a slightly higher proportion may be used up to about 1% of the total weight of the mix ingredients.

The other components of the frozen dessert mix may be retained as normally used, which ingredients comprise milk solids, butterfat, whole milk, condensed milk, skim milk, sugar (including cane or corn or both) and flavoring materials such as fruits, vanilla, chocolate, nuts, artificial flavors, etc.

The special oat fraction which desirably has been finely divided and which is prepared in accordance with the procedures of the present invention may also be added to the fruits at the time they are frozen, such addition being made in the small amount of less than 2% or the finely divided special oat fraction may be added to cream before the cream is frozen, or to any other one of the ice cream or frozen dessert ingredients so that when the fruit or the frozen cream or the ice cream ingredient containing the finely ground special oat fraction is incorporated in the ice cream mix, the ice cream mix will contain as an ingredient and stabilizer a small amount of the finely divided special oat fraction herein described.

In some cases as little as 0.05% will give a good stabilizing effect but the preferred amounts to use are in the neighborhod of 0.6% against the total weight of the ice cream mix and preferably between 0.5% and 0.75%.

The food product made by the use of a small amount of the finely divided special oat fraction as an ingredient and as the stabilizer will have an excellent body and texture and viscosity.

It has been found particularly desirable for the special oat fraction of the present invention, which preferably has been finely divided, to be added to aqueous products containing at least 10% of a sugar such as of dextrose, sucrose, glucose, lactose, etc., and desirably 40% to 50% more of sugar followed by heating to an elevated temperature of at least 150° F. and desirably to a temperature of between 190° F. and 210° F. or more to develop unusual plastic and viscous properties.

For example, in the manufacture of icings, the finely ground special oat fraction is desirably added to the icing mix containing the sugar in aqueous solution, the addition being made in a small percentage of less than about 2% followed by heating in order to develop high viscosity and plasticity. This unusual viscosity and plasticity are particularly desirable in many food products such as in icings, jams, fruit ripples for ice cream, bakery and confectionery products, etc.

There may also where desired be incorporated along with the special oat fraction or the fat extracted special oat fraction minor amounts of mono-glycerides or di-glycerides or minor amounts of polyhydric alcohols in which at least one of the hydroxyl groups is free and in which at least one of the hydroxyl groups is replaced by a fatty acid radical or minor amounts of polyhydric alcohol esters. For example, the special oat fraction may be combined with a mono- or di-glyceride or with such polyhydric alcohol esters as glyceryl-mono-oleate, glyceryl-monostearate, glyceryldistearate, diethylene glycol (mono or di) stearate, diethylene glycol (mono) oleate or any similar ester of a polyhydric alcohol having at least one free hydroxyl group. These combinations are very efficacious where it is desired to incorporate large quantities of air but at the same time retain high viscosity, heavy body and the non-sticking and non-crystallizing characteristics obtained in accordance with the procedures of the present invention.

The above polyhydric alcohol esters may be mixed mechanically with the special oat fraction but preferably a paste or aqueous dispersion is prepared in which the special oat fraction is dispersed in water such as in from 5 to 15 parts of water for each 1 part of the finely divided special oat fraction followed by adding thereto the polyhydric alcohol ester or similar composition, which combination is then placed through a colloid mill or homogenizer to thoroughly disperse the polyhydric alcohol ester therethrough followed preferably by drying as on a drum drier or by tray drying or by similar dehydration to produce a composite mass in which the polyhydric alcohol ester is thoroughly dispersed in and through the special oat fraction.

Whereas normally these polyhydric alcohol esters "oil off" or come to the surface when added to any food composition and thereby present a major difficulty when trying to obtain a uniform dispersion of the esters through the food composition, where the polyhydric alcohol ester is first combined with the special oat fraction of the present invention an unusual colloid appears to be formed whereby the polyhydric alcohol ester is uniformly dispersed throughout the food composition and remains dispersed therethrough without the oily composition coming to the surface and without "oiling off."

It has furthermore been found that a synergistic effect is obtained on combining the polyhydric alcohol esters with the special oat fraction of the present invention whereby the relative efficiency of the polyhydric alcohol ester is materially increased when combined with the special oat fraction of the present invention over that obained where the polyhydric alcohol ester is combined with gelatin or similar stabilizer.

Where desired, the special oat fraction may first be dispersed in water such as when using 1 part of the special oat fraction to between 4 and 10 parts of water followed by allowing the combination to stand for a short period of time such as up to about several hours and then followed by drying and pulverizing whereby the full stabilizing effect of the special oat fraction will have been developed and where no further time period will be required to develop the maximum stabilizing activity. During the time that the special oat fraction is allowed to stand in water an elevated temperature may be employed such as up to about 175° F.

The special novel oat fraction of the present invention also has been found to be of great value in increasing the viscosity of aqueous compositions and solutions such as in water, milk, or the like, and which aqueous composition may contain starch, sugar and which increased viscosity is obtained even within wide ranges of pH such as between pH 2 and pH 10.

The viscosity of aqueous compositions containing the special oat fraction herein described increases markedly upon standing even at room temperature and without an elevated temperature treatment. For example, it has been found that when the special fraction prepared in accordance with the procedures of the present invention is suspended in water or similar aqueous medium with or without short or prolonged heating, an unusual thickening, gelatinous and gummy suspension is formed having many useful properties and which may be used as a thickening or stabilizing agent or gum in food products or as a stabilizing agent in physical two phase systems.

Still further and unusual results are obtained by first extracting the fat from the special oat fraction or from the finely divided special oat fraction of the present invention such as by treatment of the special oat fraction or the finely divided special oat fraction with a fat solvent such as the volatile hydrocarbon oils such as hexane or petroleum ether, acetone, carbon tetrachloride, dichlor ethyl ether, or similar fat solvent or, less preferably, either an alcohol such as methyl alcohol, ethyl alcohol, propyl alcohol, isopropyl alcohol or combinations of any of the above.

The residue which is obtained following this extraction procedure and following removal of the fat has been found to develop unusually greater stabilization features with higher viscosity so that even a lesser amount of the residue from the fat extracted special oat fraction or the finely divided special oat fraction may be employed for stabilization.

By the term "total protein" as used in the claims of this application is meant the total amount of protein present in the special oat fraction of the present application.

By a "finely divided oat product" as used in the application and claims is meant an oat product which is capable of going through at least about a 50 mesh screen.

The present application is a continuation in part of applications, Serial No. 401,967 filed July 11, 1941 entitled "Water thickening agent" and Serial No. 463,651 filed October 28, 1942 entitled "Ice cream compositions." The present application is also a continuation in part of copending application Serial No. 510,831 filed November 17, 1943 entitled "Food composition."

Having described my invention, what I claim is:

1. A food composition comprising as an ingredient a small amount of a finely divided, dry milled oat product, said oat product containing in excess of about 20% total protein and said oat product having a relatively low starch and a relatively high protein content as compared to dehulled oats.

2. A food composition comprising as an ingredient a small amount of less than 10% of a dry milled oat product having a fineness of at least about 60 mesh, said oat product containing in excess of about 20% total protein and said oat product having a relatively low starch and a relatively high protein content as compared to dehulled oats.

3. A food composition comprising as an ingredient a small amount of the finely divided coarse fraction of dehulled oats, said fraction containing in excess of about 22% total protein, said fraction being free of those particles which will go through a 60 mesh screen when the dehulled oats are pulverized to a fineness that will permit about 80% to 90% thereof to pass through a 60 mesh screen.

4. A food composition comprising as an ingredient a small amount of the finely divided coarse fraction of dehulled oats, said finely divided coarse fraction being substantially free of those particles which will go through a 60 mesh screen when the dehulled oats are pulverized to a fineness that will permit a major proportion thereof to pass through a 60 mesh screen.

5. A food composition comprising as an ingredient a small amount of the finely divided coarse fraction of dehulled oats, said finely divided coarse fraction being substantially free of those particles which will go through a 60 mesh screen when the dehulled oats are pulverized to a fineness that will permit about 80% to 90% thereof to pass through a 60 mesh screen.

6. A food composition comprising as an ingredient a small amount of less than 10% of the finely divided coarse fraction of dehulled oats, said finely divided coarse fraction being substantially free of those particles which will go through a 60 mesh screen when the dehulled oats are pulverized to a fineness that will permit 80% to 90% thereof to pass through a 60 mesh screen.

7. A cheese spread comprising as an ingredient a small amount of less than about 1.5% of the finely divided coarse fraction of dehulled oats, said fraction containing in excess of about 20% total protein, said fraction being free of those particles which will go through a 60 mesh screen when the dehulled oats are pulverized to a fineness that will permit about 80% to 90% thereof to pass through a 60 mesh screen.

8. A cream cheese comprising as an ingredient a small amount of less than about 1.5% of the finely divided coarse fraction of dehulled oats, said fraction containing in excess of about 20% total protein, said fraction being free of those particles which will go through a 60 mesh screen when the dehulled oats are pulverized to a fineness that will permit about 80% to 90% thereof to pass through a 60 mesh screen.

9. A salad dressing comprising as an ingredient a small amount of less than about 5% of the finely divided coarse fraction of dehulled oats, said fraction containing in excess of about 20% total protein, said fraction being free of those particles which will go through a 60 mesh screen when the dehulled oats are pulverized to a fineness that will permit about 80% to 90% thereof to pass through a 60 mesh screen.

10. A method of producing a food composition which comprises adding as an ingredient to a food product and thoroughly distributing therethrough with mechanical agitation a small amount of the finely divided coarse fraction of dehulled oats, said finely divided coarse fraction being substantially free of those particles which will go through a 60 mesh screen when the dehulled oats are ground to a fineness that will permit a major proportion thereof to pass through a 60 mesh screen.

11. A method of producing a food composition which comprises adding as an ingredient to a food product and thoroughly distributing therethrough with mechanical agitation a small amount of less than 10% of the finely divided coarse fraction of dehulled oats, said finely divided coarse fraction being substantially free of those particles which will go through a 60 mesh screen when the dehulled oats are pulverized to a fineness that will permit 80% to 90% thereof to pass through a 60 mesh screen, and said finely divided coarse fraction containing in excess of about 20% total protein.

12. A method of producing a food composition which comprises adding as an ingredient to a food product and thoroughly distributing therethrough with mechanical agitation a small amount of a finely divided dry milled oat product, said oat product containing in excess of about 20% total protein and said oat product having a relatively low starch and a relatively high protein content as compared to dehulled oats.

13. A method of producing a cheese spread which comprises adding as an ingredient to a dairy product and thoroughly distributing therethrough with mechanical agitation a small amount of less than 1.5% of the finely divided coarse fraction of dehulled oats, and then homogenizing the dairy product at not under about 1500 pounds pressure, said finely divided coarse fraction being substantially free of those particles which will go through a 60 mesh screen when the dehulled oats are pulverized to a fineness that will permit 80% to 90% thereof to pass through a 60 mesh screen, and said finely divided coarse fraction containing in excess of about 20% total protein.

SIDNEY MUSHER.